(12) United States Patent
Al-Yami et al.

(10) Patent No.: US 9,796,622 B2
(45) Date of Patent: Oct. 24, 2017

(54) DEVELOPMENT OF HIGH TEMPERATURE LOW DENSITY CEMENT

(71) Applicant: Saudi Arabian Oil Company, Dhahran (SA)

(72) Inventors: Abdullah Selah Hussain Al-Yami, Dhahran (SA); Ahmad Saleh Al-Humaidi, Dammam (SA); Salah Hamad Al-Saleh, Dhahran (SA); Turki Thowini Mohammad AlSubaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/298,427

(22) Filed: Jun. 6, 2014

(65) Prior Publication Data

US 2015/0068429 A1    Mar. 12, 2015

Related U.S. Application Data

(60) Provisional application No. 61/875,514, filed on Sep. 9, 2013.

(51) Int. Cl.
| | | |
|---|---|---|
| C04B 7/02 | (2006.01) | |
| C04B 20/00 | (2006.01) | |
| C04B 28/04 | (2006.01) | |
| C09K 8/473 | (2006.01) | |

(52) U.S. Cl.
CPC .............. *C04B 7/02* (2013.01); *C04B 28/04* (2013.01); *C09K 8/473* (2013.01); *C04B 20/0096* (2013.01); *C04B 2235/5472* (2013.01)

(58) Field of Classification Search
CPC .............. C04B 14/104; C04B 20/0096; C04B 2235/5472
See application file for complete search history.

(56) References Cited

U.S. PATENT DOCUMENTS

| | | |
|---|---|---|
| 4,089,376 A | 5/1978 | Messenger |
| 4,120,360 A | 10/1978 | Messenger |
| 4,202,413 A | 5/1980 | Messenger |
| 4,210,457 A | 7/1980 | Dodson et al. |
| 4,234,344 A | 11/1980 | Tinsley et al. |
| 4,235,291 A | 11/1980 | Messenger |
| 4,252,193 A | 2/1981 | Powers et al. |
| 4,305,758 A | 12/1981 | Powers et al. |

(Continued)

FOREIGN PATENT DOCUMENTS

| | | | | |
|---|---|---|---|---|
| EP | 0621247 B1 | * | 7/1999 | ......... C04B 20/0076 |
| WO | WO 2009085432 A1 | * | 7/2009 | ............. C04B 28/02 |

OTHER PUBLICATIONS

Scotchlite, 3M.*

(Continued)

*Primary Examiner* — Jennifer A Smith
*Assistant Examiner* — Karam Hijji
(74) *Attorney, Agent, or Firm* — Bracewell LLP; Constance G. Rhebergen (57) ABSTRACT

The invention provides a low density cement composition. The composition includes a cement component, a glass sphere component, a bentonite component, a fine calcium carbonate component, a medium calcium carbonate component, a silica sand component, and a silica flour component.

26 Claims, 4 Drawing Sheets

(56) References Cited

U.S. PATENT DOCUMENTS

| | | | |
|---|---|---|---|
| 4,370,166 A * | 1/1983 | Powers et al. | 106/676 |
| 4,376,831 A | 3/1983 | Woo | |
| 4,432,798 A | 2/1984 | Helferich et al. | |
| 4,822,422 A | 4/1989 | Sugama | |
| 4,883,125 A * | 11/1989 | Wilson | C09K 8/24 |
| | | | 166/291 |
| 4,895,598 A | 1/1990 | Hedberg et al. | |
| 4,936,384 A | 6/1990 | Sugama | |
| 5,211,238 A | 5/1993 | Carpenter | |
| 5,213,161 A | 5/1993 | King et al. | |
| 5,718,757 A | 2/1998 | Guillou et al. | |
| 5,728,209 A | 3/1998 | Bury et al. | |
| 6,060,535 A | 5/2000 | Villar et al. | |
| 6,506,248 B1 | 1/2003 | Dueselis et al. | |
| 6,516,883 B1 | 2/2003 | Chatterji et al. | |
| 6,562,122 B2 | 5/2003 | Dao et al. | |
| 6,626,991 B1 | 9/2003 | Drochon et al. | |
| 6,656,265 B1 | 12/2003 | Garnier et al. | |
| 6,776,237 B2 | 8/2004 | Dao et al. | |
| 6,832,652 B1 | 12/2004 | Dillenbeck et al. | |
| 6,979,366 B2 | 12/2005 | Chatterji et al. | |
| 7,147,705 B2 * | 12/2006 | Chatterji et al. | 106/696 |
| 7,510,609 B2 | 3/2009 | Caveny et al. | |
| 7,524,369 B2 | 4/2009 | Caveny et al. | |
| 7,896,076 B2 | 3/2011 | Drochon | |
| 8,002,049 B2 | 8/2011 | Keese et al. | |
| 8,091,642 B2 | 1/2012 | Barlet-Gouedard et al. | |
| 8,100,180 B2 | 1/2012 | Reddy et al. | |
| 2005/0009710 A1 | 1/2005 | Heathman | |
| 2007/0032388 A1 | 2/2007 | Getzlaf et al. | |
| 2007/0125271 A1 | 6/2007 | Barlet-Gouedard et al. | |
| 2008/0286474 A1 | 11/2008 | Chevalier | |
| 2009/0197993 A1 | 8/2009 | Musch et al. | |
| 2010/0152070 A1 * | 6/2010 | Ghassemzadeh | 507/212 |
| 2010/0314112 A1 | 12/2010 | Spangle | |
| 2011/0042088 A1 * | 2/2011 | Gassemzadeh et al. | 166/292 |
| 2011/0269875 A1 | 11/2011 | Nicoleau et al. | |
| 2012/0012315 A1 | 1/2012 | Woytowich et al. | |
| 2012/0318174 A1 | 12/2012 | Ravi et al. | |
| 2013/0008654 A1 | 1/2013 | Deville et al. | |
| 2013/0065040 A1 | 3/2013 | Musch et al. | |
| 2013/0157025 A1 | 6/2013 | Sanaobar et al. | |
| 2013/0244911 A1 | 9/2013 | Benkley et al. | |

OTHER PUBLICATIONS

Nelson, E.B. "Well Cementing". Newnes. 1990.*
Barnes, P.; Bensted, J. "Structure and Performance of Cements". 2nd Ed. 2002.*
Nelson, E.B. "Well Cementing". Newnes. 1990. pp. 3-9, 3-10, 9-8, 9-10.*
Sabin, Fred. "Ultra-light Hollow Glass Spheres Improve Cement Slurry Performance for Lightweight Cement Applications". Cementing Solutions Inc. Apr. 2004. Retrieved from http://multimedia.3m.com/mws/media/283021O/glass-bubbles-improve-performance-for-lightweight-cement-apps.pdf.*
PCT International Search Report and the Written Opinion; dated Jan. 16, 2015; International Application No. PCT/US2014/053062; International File Date: Aug. 28, 2014.
Al-Yami, A.S., et al.; Development of a Drilling Expert System for Designing and Applying Successful Cement Jobs; IADC/SPE Asia Pacific Drilling Technology Conference and Exhibition held in Ho Chi Minh City, Vietnam; Nov. 1-3, 2010; pp. 1-23; IADC/SPE Asia Pacific Drilling Technology Conference and Exhibition.
Al-Yami, A.S., et al.; Long Term Evaluation of Low-Density Cement: Laboratory Studies and Field Application; 15th SPE Middle East Oil & Gas Show and Conference held in Bahrain International Exhibition Centre, Kingdom of Bahrain, Mar. 11-14, 2007; pp. 1-22; Society of Petroleum Engineers.
Mueller, D., et al.; Cementing Products and Additives; World Oil; Mar. 1, 1998; pp. 87-90, 92; vol. 219, No. 3; Gulf Publishing Company.

* cited by examiner

DEVELOPMENT OF HIGH TEMPERATURE LOW DENSITY CEMENT

CROSS-REFERENCE TO RELATED PATENT APPLICATIONS

This application claims priority to U.S. Provisional Application No. 61/875,514, filed on Sep. 9, 2013, titled "Development of High Temperature Low Density Cement."

BACKGROUND

Field of the Invention

This invention generally relates to low density cement compositions. More specifically, this invention relates to low density cements for use in high temperature conditions for cementing wells.

Background of the Invention

Cementing a string in one stage is a challenging task, especially in the presence of weak formations, including where there is a lost circulation zone. Cement slurry losses during placement can occur when the equivalent circulating density (ECD) exceeds 10.96 lb/gal during placement. A conventional method to overcome this challenge is to use multi-stage cementing by setting the stage tool above the loss circulation zone. However, stage tools can fail, thus causing serious delay and economic loss due to remedial operations such as perforation and squeeze jobs. Furthermore, complexity of multi-stage installing also leads to failure. In addition, stage tools are considered weak points and not good for use as long term seals. A second method for zonal isolation is to use low density cement.

Low density cement slurries can be used to reduce the hydrostatic pressure on weak formations and to cement lost circulation zones. Examples of low density cements are water extender cements, foam cements, and hollow microsphere cements.

Water extender cements are generally limited in density to about 11.50 lb/gal. Cement fallback often occurs and top of set cement can be hundreds of feet below the ground level because the formations cannot withstand the hydrostatic load exerted by water extender cements even if full circulation is maintained to the surface and cement returns are noted. Sulfide-containing water can also corrode the uncemented casing resulting in expensive remedial treatments. Water extender cements can be used in multistage operations, however multistage cementing shows only limited success, as discussed above.

To avoid multistage tools failure as well as the problems associated with the other types of cements noted above, hollow microsphere cement has been developed. Hollow microsphere cement can be used to prepare cement having a density of about 9.22 lb/gal cement. A gas can be contained in the microspheres to further reduce cement density further down to about 8.02 lb/gal.

There are several methods to prepare hollow microsphere cement. One way is to prepare a mixture of coarse and fine cement particles, fly ash, fumed silica, hollow glass spheres, and water. Another method is to add hollow glass or ceramic microspheres to plasticizer, cement, and a strengthening agent such as aluminum metal powder and sodium sulfate. However, these existing hollow microsphere cement formulations are subject to problems related to fluid loss control and low compressive strength. A new design of low density cement to enhance and maintain the compressive strength that can eliminate multistage cementing operations, when possible, is needed.

SUMMARY

Embodiments of the present invention provide low density cement compositions. The compositions include a cement component, a glass sphere component, a bentonite component, a fine calcium carbonate component, a medium calcium carbonate component, a silica sand component, and a silica flour component. In further embodiments, the cement component includes both a Portland cement component and a microfine cement component.

Embodiments of the present invention have enough compressive strength to support casing and provide good wellbore isolation without the need to add strengthening agents such as aluminum metal powder or sodium sulfate.

DRAWINGS

These and other features, aspects, and advantages of the present invention are better understood with regard to the following Detailed Description of the Preferred Embodiments, appended Claims, and accompanying Figures, where:

FIGS. 1-4 and their description facilitate a better understanding of the low density cement composition. In no way should FIGS. 1-4 limit or define the scope of the invention. FIGS. 1-4 are simple diagrams for ease of description.

DETAILED DESCRIPTION

Although the following detailed description contains many specific details for purposes of illustration, it is understood that one of ordinary skill in the art will appreciate that many examples, variations, and alterations to the following details are within the scope and spirit of the invention. Accordingly, the exemplary embodiments of the invention described herein and provided in the appended figures are set forth without any loss of generality, and without imposing limitations, on the claimed invention.

In one embodiment, the invention provides a low density cement composition. The composition includes a cement component, a glass sphere component, a bentonite component, a fine calcium carbonate component, a medium calcium carbonate component, a silica sand component, and a silica flour component. In some embodiments, the glass sphere component can be used to reduce density, the bentonite component can be used to improve fluid loss, and the medium and fine calcium carbonate can be used to improve fluid loss control by bridging the formation to be cemented. In some embodiments, both silica sand and silica flour can be used to enhance compressive strength. In some embodiments, fine and medium sized components can be selected to reduce porosity of cement and thus further enhance compressive strength.

The low density cement composition has enhanced properties that yield a cement that can be used to cement high temperature wells in a single stage. The enhanced properties include better and improved fluid loss control and enhanced compressive strength, as well as reduced porosity.

The cement component can be any acceptable cement component for use in the embodiments described herein. In some embodiments, the cement component is a Portland cement. For example, the Portland cement can include classes A, B, C, D, E, F, G, and H. In further embodiments, the cement component includes a microfine cement component. In further embodiments, the microfine cement component has an average particle size of less than 5 microns. In other embodiments, the microfine cement component has an average particle size of about 5 microns. In other embodiments, the microfine cement component has an average particle size of about 4 microns. In other embodiments, the microfine cement component has an average particle size of about 3 microns. In other embodiments, the microfine cement component has an average particle size of about 2 microns. In further embodiments, the cement component includes both Portland cement and microfine cement. In further embodiments, the cement component includes Portland cement present in an amount of about 100% BWOC (by weight of cement) and microfine cement present in an amount of about 50% BWOC. The amount of the primary cement by definition (in this case Portland cement) is 100%, whereas the other cement components are defined in percent of BWOC of the primary cement, including secondary cement components like the microfine cement. Without wishing to be bound by theory, it is believed that combinations of Portland cement and microfine cement enhance compressive strength by reducing the porosity of the low density cement compositions.

The glass sphere component can be any glass sphere component having a reduced density. In some embodiments, the glass sphere component is present in an amount of about 20-100% BWOC. In some embodiments, the glass sphere component is present in an amount of about 20-30% BWOC. In some embodiments, the glass sphere component is present in an amount of about 30-40% BWOC. In some embodiments, the glass sphere component is present in an amount of about 40-50% BWOC. In some embodiments, the glass sphere component is present in an amount of about 50-60% BWOC. In some embodiments, the glass sphere component is present in an amount of about 60-70% BWOC. In some embodiments, the glass sphere component is present in an amount of about 70-80% BWOC. In some embodiments, the glass sphere component is present in an amount of about 80-90% BWOC. In some embodiments, the glass sphere component is present in an amount of about 90-100% BWOC. In some embodiments, the glass sphere component includes hollow glass spheres. In some embodiments, the hollow glass spheres include any hollow glass spheres that can attain specific gravities of between 0.32 and 0.60, while resisting wellbore pressures between 2,000 and 18,000 psi. Use of such hollow spheres allows for higher compressive strength and lower density compositions.

The bentonite component is impure clay made mostly of montmorillonite. In some embodiments, the bentonite component is present in an amount of about 0.25-20% BWOC. In some embodiments, the bentonite component is present in an amount of about 0.25-1% BWOC. In some embodiments, the bentonite component is present in an amount of about 1-5% BWOC. In some embodiments, the bentonite component is present in an amount of about 5-10% BWOC. In some embodiments, the bentonite component is present in an amount of about 10-15% BWOC. In some embodiments, the bentonite component is present in an amount of about 15-20% BWOC. In some embodiments, the bentonite component is present in an amount of about 0.25% BWOC. In some embodiments, the bentonite component is present in an amount of about 1% BWOC. In some embodiments, the bentonite component is present in an amount of about 5% BWOC. In some embodiments, the bentonite component is present in an amount of about 10% BWOC. In some embodiments, the bentonite component is present in an amount of about 15% BWOC. In some embodiments, the bentonite component is present in an amount of about 20% BWOC. The bentonite component can include potassium bentonite, sodium bentonite, calcium bentonite, and aluminum bentonite. In some embodiments, the bentonite component includes a mixture of bentonites. The bentonite component improves fluid loss control and is a preferred component due to its ability to bond strongly with a well casing. Materials such as organophillic clay typically cannot be used in embodiments of the present invention, as such materials typically do not bond strongly with a well casing.

The fine calcium carbonate component includes any fine calcium carbonate. In some embodiments, the fine calcium carbonate component is present in an amount of about 1-100% BWOC. In some embodiments, the fine calcium carbonate component is present in an amount of about 1-10% BWOC. In some embodiments, the fine calcium carbonate component is present in an amount of about 10-20% BWOC. In some embodiments, the fine calcium carbonate component is present in an amount of about 20-30% BWOC. In some embodiments, the fine calcium carbonate component is present in an amount of about 30-40% BWOC. In some embodiments, the fine calcium carbonate component is present in an amount of about 40-50% BWOC. In some embodiments, the fine calcium carbonate component is present in an amount of about 50-60% BWOC. In some embodiments, the fine calcium carbonate component is present in an amount of about 60-70% BWOC. In some embodiments, the fine calcium carbonate component is present in an amount of about 70-80% BWOC. In some embodiments, the fine calcium carbonate component is present in an amount of about 80-90% BWOC. In some embodiments, the fine calcium carbonate component is present in an amount of about 90-100% BWOC. In some embodiments, the fine calcium carbonate component is present in an amount of about 1% BWOC. In some embodiments, the fine calcium carbonate component is present in an amount of about 10% BWOC. In some embodiments, the fine calcium carbonate component is present in an amount of about 20% BWOC. In some embodiments, the fine calcium carbonate component is present in an amount of about 30% BWOC. In some embodiments, the fine calcium carbonate component is present in an amount of about 40% BWOC. In some embodiments, the fine calcium carbonate component is present in an amount of about 50% BWOC. In some embodiments, the fine calcium carbonate component is present in an amount of about 60% BWOC. In some embodiments, the fine calcium carbonate component is present in an amount of about 70% BWOC. In some embodiments, the fine calcium carbonate component is present in an amount of about 80% BWOC. In some embodiments, the fine calcium carbonate component is present in an amount of about 90% BWOC. In some embodiments, the fine calcium carbonate component is present in an amount of about 100% BWOC. In some embodiments, the fine calcium carbonate has a specific gravity of about 2.6 to about 2.8 and a mean particle size distribution of about 20 microns. In further embodiments, the fine calcium carbonate has a specific gravity of less than about 2.8. In further embodiments, the fine calcium carbonate has a mean particle size distribution of less than about 20 microns. In some embodiments, the source rock is pure marble.

The medium calcium carbonate component includes any medium calcium carbonate component. In some embodiments, the medium calcium carbonate component is present in an amount of about 1-100% BWOC. In some embodiments, the medium calcium carbonate component is present in an amount of about 1-10% BWOC. In some embodiments, the medium calcium carbonate component is present in an amount of about 10-20% BWOC. In some embodiments, the medium calcium carbonate component is present in an amount of about 20-30% BWOC. In some embodiments, the medium calcium carbonate component is present in an amount of about 30-40% BWOC. In some embodiments, the medium calcium carbonate component is present in an amount of about 40-50% BWOC. In some embodiments, the medium calcium carbonate component is present in an amount of about 50-60% BWOC. In some embodiments, the medium calcium carbonate component is present in an amount of about 60-70% BWOC. In some embodiments, the medium calcium carbonate component is present in an amount of about 70-80% BWOC. In some embodiments, the medium calcium carbonate component is present in an amount of about 80-90% BWOC. In some embodiments, the medium calcium carbonate component is present in an amount of about 90-100% BWOC. In some embodiments, the medium calcium carbonate component is present in an amount of about 1% BWOC. In some embodiments, the medium calcium carbonate component is present in an amount of about 10% BWOC. In some embodiments, the medium calcium carbonate component is present in an amount of about 20% BWOC. In some embodiments, the medium calcium carbonate component is present in an amount of about 30% BWOC. In some embodiments, the medium calcium carbonate component is present in an amount of about 40% BWOC. In some embodiments, the medium calcium carbonate component is present in an amount of about 50% BWOC. In some embodiments, the medium calcium carbonate component is present in an amount of about 60% BWOC. In some embodiments, the medium calcium carbonate component is present in an amount of about 70% BWOC. In some embodiments, the medium calcium carbonate component is present in an amount of about 80% BWOC. In some embodiments, the medium calcium carbonate component is present in an amount of about 90% BWOC. In some embodiments, the medium calcium carbonate component is present in an amount of about 100% BWOC. In some embodiments, the medium calcium carbonate component has a specific gravity of about 2.6 to about 2.8 and a mean particle size distribution of about 150 microns. In some embodiments, the medium calcium carbonate component has a specific gravity of less than about 2.8. In some embodiments, the medium calcium carbonate component has a mean particle size distribution of about 100 to about 150 microns. In some embodiments, the source rock is pure marble.

Use of the two different calcium carbonate components assists in improving bridging and improves fluid loss control.

In some embodiments, the silica sand component is any naturally occurring or man-made silica sand. In some embodiments, the silica sand component is present in an amount of about 1-100% BWOC. In some embodiments, the silica sand component is present in an amount of about 1-10% BWOC. In some embodiments, the silica sand component is present in an amount of about 10-20% BWOC. In some embodiments, the silica sand component is present in an amount of about 20-30% BWOC. In some embodiments, the silica sand component is present in an amount of about 30-40% BWOC. In some embodiments, the silica sand component is present in an amount of about 40-50% BWOC. In some embodiments, the silica sand component is present in an amount of about 50-60% BWOC. In some embodiments, the silica sand component is present in an amount of about 60-70% BWOC. In some embodiments, the silica sand component is present in an amount of about 70-80% BWOC. In some embodiments, the silica sand component is present in an amount of about 80-90% BWOC. In some embodiments, the silica sand component is present in an amount of about 90-100% BWOC. The silica sand component can have a variety of particle sizes. In some embodiments, the silica sand component has an average particle size of about 100 microns. In some embodiments, the silica sand component has an average particle size of from about 100 to 200 microns. In some embodiments, the silica sand component has an average particle size of from about 175 to 200 microns. In some embodiments, the silica sand component has an average particle size of about 110 microns. In some embodiments, the silica sand component has an average particle size of about 120 microns. In some embodiments, the silica sand component has an average particle size of about 130 microns. In some embodiments, the silica sand component has an average particle size of about 140 microns. In some embodiments, the silica sand component has an average particle size of about 150 microns. In some embodiments, the silica sand component has an average particle size of about 160 microns. In some embodiments, the silica sand component has an average particle size of about 170 microns. In some embodiments, the silica sand component has an average particle size of about 180 microns. In some embodiments, the silica sand component has an average particle size of about 190 microns. In some embodiments, the silica sand component has an average particle size of about 200 microns.

The silica flour component is used in combination with silica sand to formulate the low density cement such that it resists gas migration problems. In some embodiments, the silica flour component is present in an amount of about 1-100% BWOC. In some embodiments, the silica flour component is present in an amount of about 1-10% BWOC. In some embodiments, the silica flour component is present in an amount of about 10-20% BWOC. In some embodiments, the silica flour component is present in an amount of about 20-30% BWOC. In some embodiments, the silica flour component is present in an amount of about 30-40% BWOC. In some embodiments, the silica flour component is present in an amount of about 40-50% BWOC. In some embodiments, the silica flour component is present in an amount of about 50-60% BWOC. In some embodiments, the silica flour component is present in an amount of about 60-70% BWOC. In some embodiments, the silica flour component is present in an amount of about 70-80% BWOC. In some embodiments, the silica flour component is present in an amount of about 80-90% BWOC. In some embodiments, the silica flour component is present in an amount of about 90-100% BWOC. In some embodiments, the silica flour component has an average particle size of about 15 microns. Without wishing to be bound by theory, it is believed that the combination of silica sand component and silica flour component increases the solids packing density of the cement blend and thus reduces the permeability of set cement to gas flow. The combination of both a silica sand component and a silica flour component assists in preventing strength retrogression and enhances compressive strength at elevated temperatures. Use of the two silica components having different average particle sizes assists in reducing the porosity of the cement and enhances the compressive strength of the low density cement compositions.

In further embodiments, a retarder component may be included in the low density cement composition. As one of skill in the art will understand, retarders allow a sufficient amount of time to place the cement behind the casing before curing.

In further embodiments, a fluid loss additive component may be included in the low density cement composition. As one of skill in the art will understand, fluid loss additives can be used to enhance fluid loss control.

A person of skill in the art will understand that the use of materials such as fly ash are not desired in the present low density cement compositions, as such materials would lower compressive strength of the composition. Higher compressive strengths are desired, and the low density cement compositions described herein provide the desired higher compressive strengths. Additionally, a person of skill in the art will understand that the use of cross-linker materials is not desired in the present low density cement compositions. While cross-linker materials are suitable for providing fluid viscosities desired for fracturing operations, such viscosities are not desired for cementing of casings, and thus would not be desirable for the low density cement compositions described herein.

EXAMPLES

Examples of specific embodiments facilitate a better understanding of the low density cement composition. In no way should the Examples limit or define the scope of the invention.

Example 1

Table 1 shows the low density cement slurry formulation for Example 1.

TABLE 1

Example 1 low density cement slurry formulation

| Material | Lab design | Field design |
| --- | --- | --- |
| Water | 175 g | 9.82 gps |
| Bentonite (fluid loss + density reducer) (Nontreated sodium montmorillonite, Wyoming type) | 1 g | 0.5% percent |
| fluid loss additive (hydroxy ethyl cellulose) | 0.5 g | 0.25% |
| Retarder (sodium and calcium salts of lignosulphonic acids) | 1 g | 0.5% percent |
| latex | 18 g | 1 gps % |
| Defoamer (polyglycol ethers or silicones) | As needed | |
| Cement (Portland Class G cement with mean diameter of 15-18 microns) | 200 g | 100% |

TABLE 1-continued

Example 1 low density cement slurry formulation

| Material | Lab design | Field design |
| --- | --- | --- |
| Glass Spheres (3M hollow glass spheres with specific gravities of between 0.32 and 0.60) | 100 g | 50.00% |
| Microfine cement (median diameter of 2-3 microns) | 100 g | 50.00% |
| $CaCO_3$ (fine) | 13 g | 6.50% |
| $CaCO_3$ (medium) | 7 g | 3.50% |
| Silica Sand | 20 g | 10% |
| Silica Flour | 36 g | 18% |
| Expansion additive (calcined magnesium oxide) | 2 g | 1% |
| Targeted Density | 83 pcf | 83 pcf |

Example 1 composition underwent a compressive strength test and free water test.

Compressive Strength Test:

The compressive strength of the cement is the result of the growth of hydrated calcium silicate crystalline structures. As these structures grow, they gain more strength and interlock with each other. Bond strength of these crystals will be weakened as the water to cement ratio increases, thus decreasing the cement compressive strength. Compressive strength testing measures the strength of the cement using a HP/HT curing chamber at elevated temperatures and pressures simulating conditions in the wells. The slurries described in Table 1 were prepared according to API Recommended Practice 10B-2 and were poured into the standard API compressive strength 2"×2"×2" cubical molds.

The slurry was prepared by weighting cement and water, as shown in Table 1. Every material weight was measured BWOC. Water was 87.5% BWOC, to which was added bentonite (0.5% BWOC), fluid loss additive (0.25% BWOC), retarder (0.5% BWOC), latex (1 gallon per sack of cement or 9% BWOC), hollow glass spheres (50% BWOC), micro-fine cement (50% BWOC), $CaCO_3$ fine (6.5% BWOC), $CaCO_3$ medium (3.5% BWOC), silica sand (10% BWOC), silica flour (18% BWOC), expansion additive (1% BWOC), and defoamer as needed.

Figure 1:
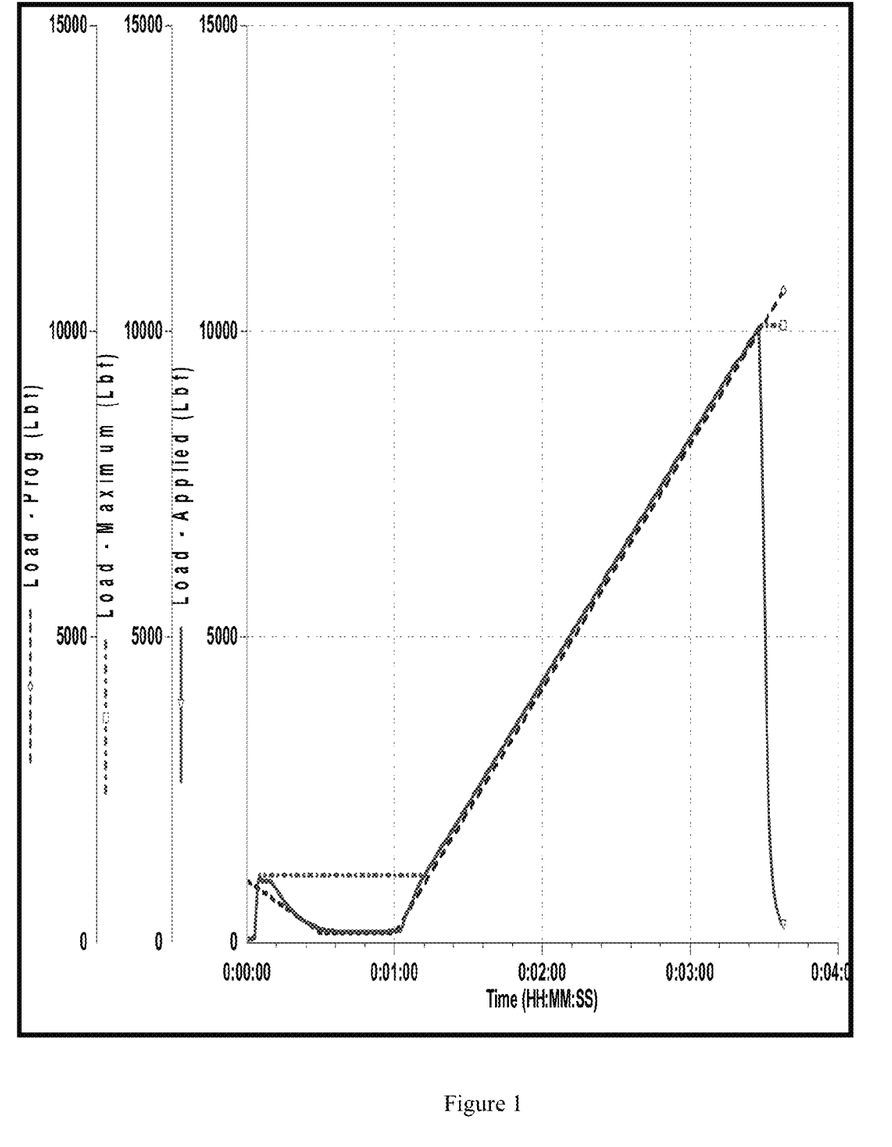
FIG. 1 shows an example of LDC API compressive strength load chart.

The molds were poured and were lowered into the curing chamber. The curing chamber was filled with water to expel gas. A temperature controller regulated the sample temperature. Pressures and temperatures were maintained until shortly before the end of the curing. The temperature and pressure were reduced to ambient conditions, and then the test specimens were removed from the curing chamber. The conditions were 300° F. curing temperature, and 3,000 psi confining pressure. The set cement cubes were removed from the molds, and placed in a hydraulic press where increasing force was exerted on each cube until failure. The hydraulic press system used in this study applied known compressive loads to the samples as shown in FIG. 1. FIG. 1 shows an example of LDC API compressive strength load chart. This system was designed to test the compressive strength of sample cement cubes in compliance with API specifications for oil well cement testing.

Figure 2:
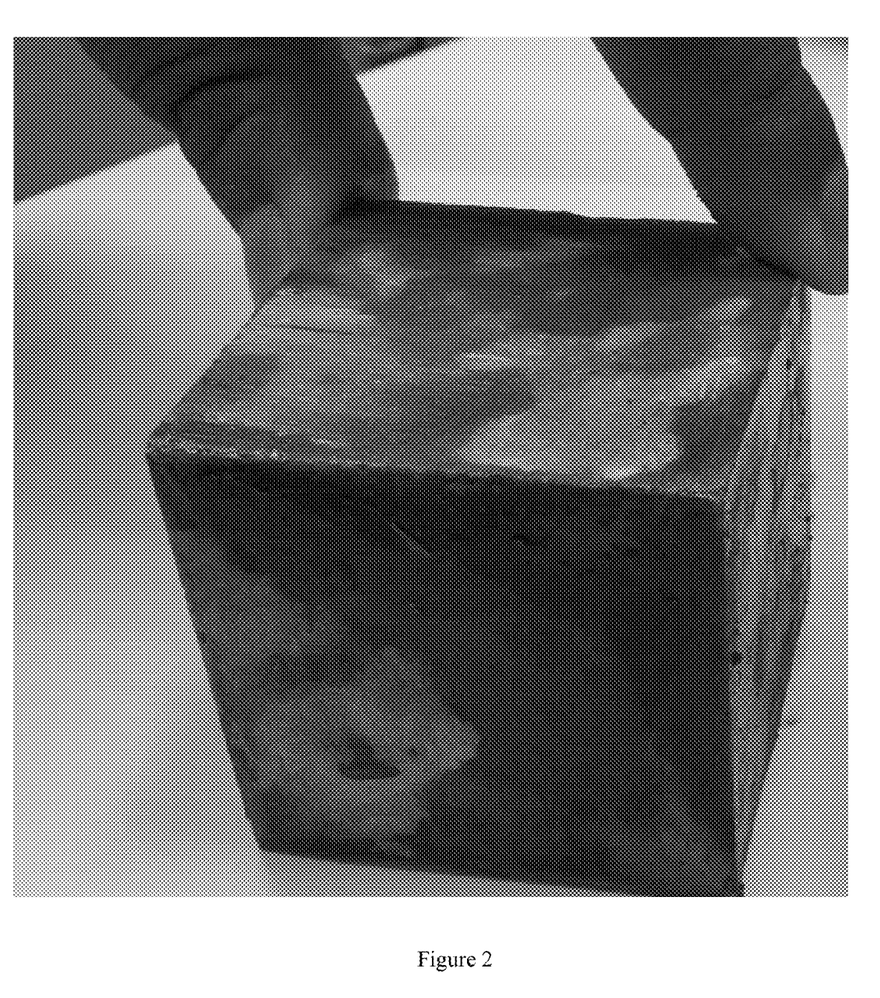
FIG. 2 shows an image of an embodiment low density cement composition—Example 1—after curing at 300° F. for 3 days.

FIG. 2 shows an image of embodiment low density cement—Example 1—after curing at 300° F. for 3 days.

Figure 3:
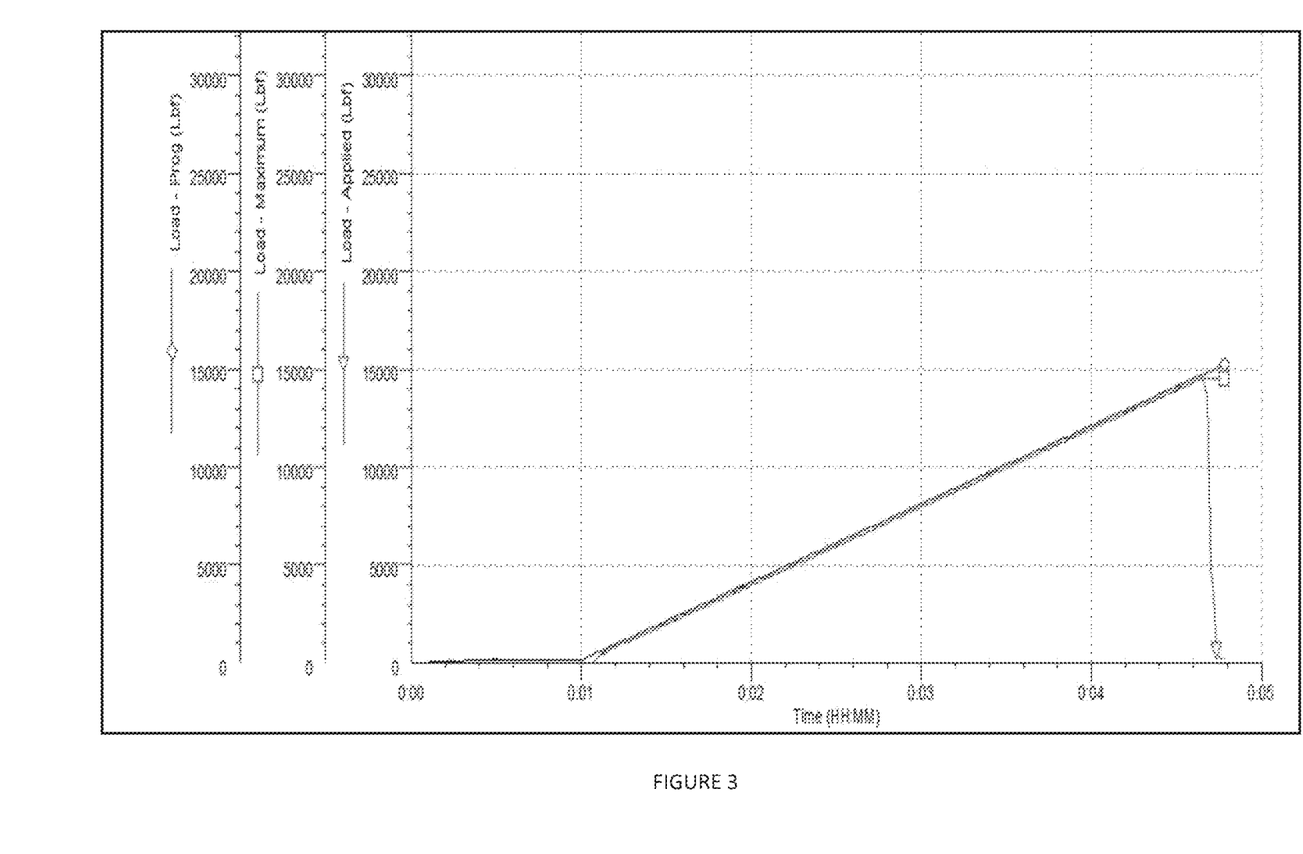
FIG. 3 shows a graph of compressive strength of cured Example 1 is measured using the API crushing method, which shows cured Example 1 has a compressive strength of 3623 psi.
Figure 4:
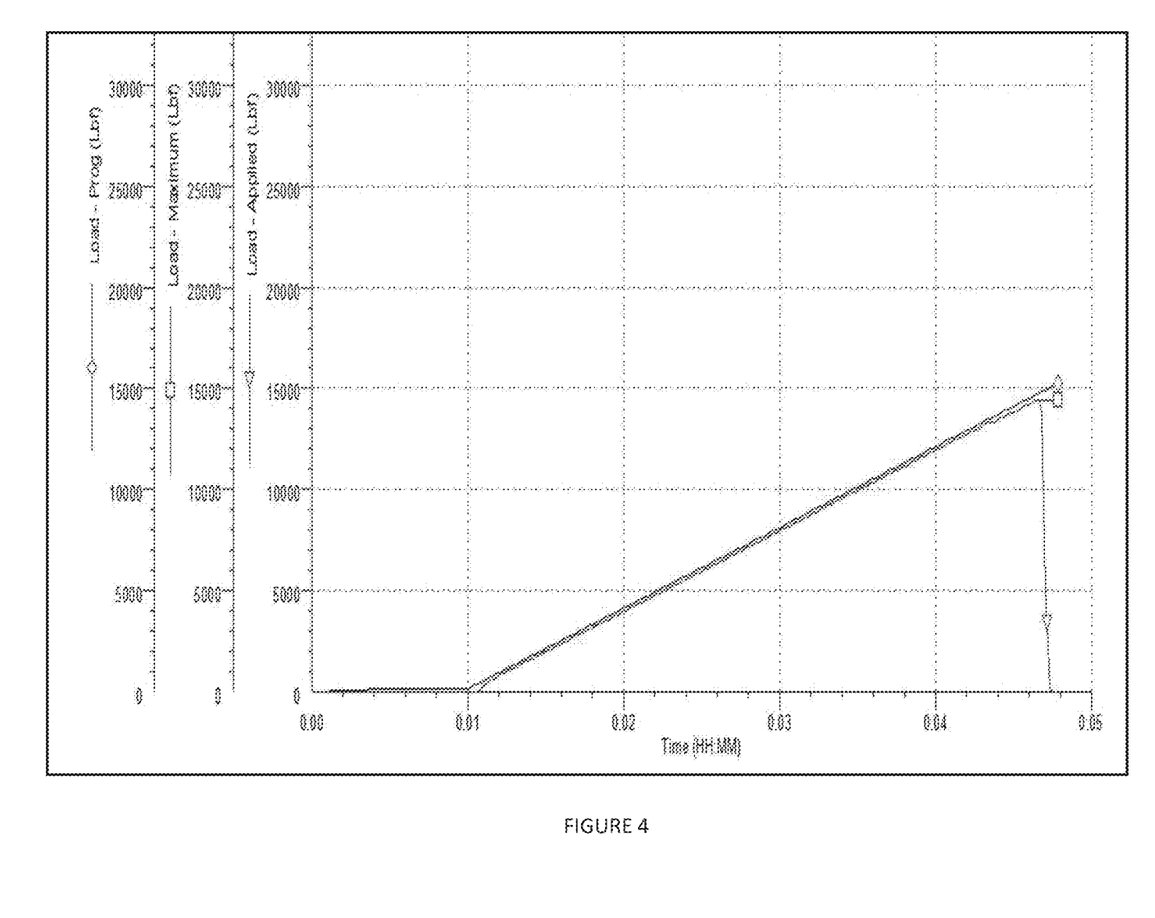
FIG. 4 shows a graph of compressive strength of cured Example 1 is measured using the API crushing method, which shows cured Example 1 has a compressive strength of 3,595 psi.

The compressive strength of the LDC substantially exceeds both values (100 and 500 psi), as shown in FIGS. 3 and 4. In FIG. 3, the compressive strength of cured Example 1 is measured using the API crushing method, which shows cured Example 1 has a compressive strength of 3,623 psi. In FIG. 4, the compressive strength of cured Example 1 measured using API crushing method shows cured Example 1 has a compressive strength of 3,595 psi.

Free Water Test:

When a cement slurry is allowed to stand for a period of time prior to set, water may separate from the slurry migrating upwards. This separation can result in zone isolation problems. The free water test is designed to measure water separation using a 250 ml graduated cylinder. The duration of the test is 2 hours according to API 10B-2 procedure. The free water test showed no settling in the LDC slurry and the fluid loss was acceptable, as shown in Table 2.

TABLE 2

API fluid loss values of the LDC samples

| Mode of Fluid Loss | Test Temperature, °F. | Time to Collect Fluids, min | API Fluid Loss, ml/30 min |
|---|---|---|---|
| Static | 190 | 30 | 60 |

Comparative Example 2

Comparative Fluid Loss Test:

A comparative slurry was prepared by weighting cement and water, but without the use of calcium carbonate components, as shown in Table 3. Every material weight was measured BWOC. Water was 87.5% BWOC, to which was added bentonite (0.5% BWOC), fluid loss additive (0.25% BWOC), retarder (0.5% BWOC), latex (1 gallon per sack of cement or 9% BWOC), hollow glass spheres (50% BWOC), micro-fine cement (50% BWOC), silica sand (10% BWOC), silica flour (18% BWOC), expansion additive (1% BWOC), and defoamer as needed. The composition was tested according to API RP 10B-2 procedure. The results are shown in Table 4.

TABLE 3

Comparative slurry composition

| Material | Lab design | Field design |
|---|---|---|
| Water | 175 g | 9.82 gps |
| Bentonite (fluid loss + density reducer) (Nontreated sodium montmorillonite, Wyoming type) | 1 g | 0.5% percent |
| fluid loss additive (hydroxy ethyl cellulose) | 0.5 g | 0.25% |
| Retarder (sodium and calcium salts of lignosulphonic acids) | 1 g | 0.5% percent |
| latex | 18 g | 1 gps % |
| Defoamer (polyglycol ethers or silicones) | As needed | |
| Cement (Portland Class G cement with mean diameter of 15-18 microns) | 200 g | 100% |
| Glass Spheres (3M hollow glass spheres with specific gravities of between 0.32 and 0.60) | 100 g | 50.00% |
| Microfine cement (median diameter of 2-3 microns) | 100 g | 50.00% |
| $CaCO_3$ (fine) | 0 g | 0% |
| $CaCO_3$ (medium) | 0 g | 0% |
| Silica Sand | 20 g | 10% |
| Silica Flour | 36 g | 18% |
| Expansion additive (calcined magnesium oxide) | 2 g | 1% |
| Targeted Density | 83 pcf | 83 pcf |

TABLE 4

API fluid loss values of the comparative samples

| Mode of Fluid Loss | Test Temperature, °F. | Time to Collect Fluids, min | API Fluid Loss, ml/30 min |
|---|---|---|---|
| Static | 190 | 30 | No control; all cement fluid was lost and passed through the API metal screen |

The comparative test confirmed that calcium carbonate is a critical component of the low density cement compositions due to its ability to control fluid loss.

The developed low density cement compositions described herein can be used to cement casing in one stage instead of multistage operations because the low density of the fluid reduces the hydrostatic pressure on the formation. Therefore, compositions described herein will allow for cementing in single stage. This can result in: saving rig time, avoiding problems associated with multistage cementing, and improving wellbore isolation.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Where the Specification or the appended Claims provide a range of values, it is understood that the interval encompasses each intervening value between the first limit and the second limit as well as the first limit and the second limit. The invention encompasses and bounds smaller ranges of the interval subject to any specific exclusion provided. "Substantial" means equal to or greater than 10% by the indicated unit of measure.

As used herein and in the appended claims, the words "comprise," "has," and "include" and all grammatical variations thereof are each intended to have an open, non-limiting meaning that does not exclude additional elements or steps. The referenced elements, components or steps may be present, utilized or combined with other elements, components or steps not expressly referenced. The invention illustrative disclosed suitably may be practiced in the absence of any element which is not specifically disclosed, including as "consisting essentially of" and "consisting of".

That which is claimed is:

1. A low density cement composition, the composition comprising:
    a cement component;
    a glass sphere component, the glass sphere component sized to withstand up to 18,000 psi;
    a bentonite component consisting essentially of montmorillonite at a concentration of 0.5% by weight of cement (BWOC);
    a calcium carbonate mix having two calcium carbonate components with separate particle sizes, the calcium carbonate mix in an amount of about 10% BWOC and having:

a fine calcium carbonate component characterized by an average particle size of 20 microns; and a medium calcium carbonate component characterized by an average particle size distribution in a range of from 100 microns to 150 microns, wherein the amount by weight of medium calcium carbonate component is less than the amount by weight of fine calcium carbonate component; and a silica mix having two silica components with separate particle sizes, the silica mix having:

a silica sand component characterized by an average particle size in a range of from 175 microns to 200 microns; and a silica flour component characterized by an average particle size of 15 microns, wherein the amount by weight of silica flour component is greater than the amount by weight of silica sand component.

2. The low density cement composition of claim 1, wherein the glass sphere component is a hollow glass sphere component.

3. The low density cement composition of claim 1, wherein the glass sphere component is in a range of from 20% to 100% by weight of cement (BWOC).

4. The low density cement composition of claim 1, wherein the fine calcium carbonate component is in a range of from 1% to 10% BWOC.

5. The low density cement composition of claim 1, wherein the medium calcium carbonate component is in a range of from 1% to 10% BWOC.

6. The low density cement composition of claim 1, wherein the silica sand component is in a range of from 1% to 100% BWOC.

7. The low density cement composition of claim 1, wherein the silica flour component is in a range of from 1% to 100% BWOC.

8. The low density cement composition of claim 1, wherein the cement component is a Portland cement.

9. The low density cement composition of claim 1, wherein the cement component is a Portland cement and a microfine cement characterized by a particle size in a range of from 2 microns to 5 microns.

10. A low density cement composition, the composition comprising:

a Portland cement component;

a microtine cement component characterized by a particle size in a range of from 2 microns to 5 microns;

a glass sphere component, the glass sphere component sized to withstand up to 18,000 psi;

a bentonite component consisting essentially of montmorillonite at a concentration of 0.5% by weight of cement (BWOC);

a calcium carbonate mix having two calcium carbonate components with separate particle sizes, the calcium carbonate mix having:

a fine calcium carbonate component characterized by a particle size of 20 microns; and a medium calcium carbonate component characterized by a particle size in a range of from 100 microns to 150 microns, wherein the amount by weight of medium calcium carbonate component is less than the amount by weight of fine calcium carbonate component; and a silica mix having two silica components with separate particle sizes, the silica mix having:

a silica sand component characterized by a particle size in a range of from 175 microns to 200 microns; and a silica flour component characterized by a particle size of 15 microns, wherein the amount by weight of silica flour component is greater than the amount by weight of silica sand component.

11. The low density cement composition of claim 10, wherein the glass sphere component is a hollow glass sphere component.

12. The low density cement composition of claim 1, wherein the fine calcium carbonate component is in an amount of about 6.5% BWOC.

13. The low density cement composition of claim 1, wherein the medium calcium carbonate component is in an amount of about 3.5% BWOC.

14. The low density cement composition of claim 1, wherein the low density cement composition has a density of about 83 pcf and a compressive strength from 3,595 to 3,623 psi.

15. The low density cement composition of claim 14, wherein the low density cement composition has an API fluid loss of 60 ml over 30 minutes.

16. A method of using the low density cement composition of claim 1, the method including:

providing the low density cement composition having the calcium carbonate mix in an amount of about 10% BWOC with a compressive strength from 3,595 to 3,623 psi;

cementing a casing of a well with the low density cement composition to support the casing and provide wellbore isolation.

17. The method of claim 16, further including minimizing hydrostatic pressure on a formation within a circulation zone with the low density cement composition, wherein the low density cement composition has a density of about 83 pcf.

18. The method of claim 16, wherein the low density cement composition is free of additional strengthening agents.

19. The method of claim 16, wherein the well is a high temperature and high pressure well.

20. The method of claim 16, wherein the well has a temperature of about 300° F.

21. The method of claim 16, wherein the well has a pressure in a range of 10,000 psi to 18,000 psi.

22. The method of claim 16, further comprising providing fluid loss control with the low density cement composition having an API fluid loss of 60 ml over 30 minutes.

23. A method of cementing a casing of a high temperature well in one stage, the method including:

circulating the low density cement composition of claim 1 having the calcium carbonate mix in an amount of about 10% BWOC into the high temperature well to support the casing, wherein the well has a pressure in a range of 10,000 psi to 18,000 psi; and allowing the low density cement composition to cure and form a bond with the casing to provide zonal isolation within the high temperature well.

24. The method of claim 23, wherein the low density cement composition has a density of about 83 pcf for minimizing hydrostatic pressure on a formation within a circulation zone with the low density cement composition.

25. The method of claim 23, wherein the high temperature well has a temperature of about 300° F.

26. The method of claim 23, wherein the low density cement composition has an API fluid loss of 60 ml over 30 minutes for providing fluid loss control within the high temperature well.

* * * * *

UNITED STATES PATENT AND TRADEMARK OFFICE
CERTIFICATE OF CORRECTION

PATENT NO. : 9,796,622 B2
APPLICATION NO. : 14/298427
DATED : October 24, 2017
INVENTOR(S) : Al-Yami et al.

Page 1 of 1

It is certified that error appears in the above-identified patent and that said Letters Patent is hereby corrected as shown below:

On the Title Page

Item (72) Inventors: The first Inventor's name appears as "Abdullah Selah Hussain Al-Yami" and should appear as "Abdullah Saleh Hussain Al-Yami"

In the Claims

In Column 11, Line 45, Claim 10, the second word appears as "microtine" and should be "microfine"

Signed and Sealed this
Twenty-first Day of August, 2018

Andrei Iancu
*Director of the United States Patent and Trademark Office*